(12) United States Patent
Murr

(10) Patent No.: US 6,469,545 B2
(45) Date of Patent: Oct. 22, 2002

(54) CIRCUIT CONFIGURATION FOR DETECTING THE STATE OF AT LEAST ONE ELECTRICAL ACTUATING ELEMENT

(75) Inventor: Robert Murr, Barbing (DE)

(73) Assignee: Siemens Aktiengesellschaft, Munchin (DE)

(*) Notice: Subject to any disclaimer, the term of this patent is extended or adjusted under 35 U.S.C. 154(b) by 0 days.

(21) Appl. No.: 09/965,487

(22) Filed: Sep. 27, 2001

(65) Prior Publication Data

US 2002/0050841 A1 May 2, 2002

(30) Foreign Application Priority Data

Sep. 27, 2000 (DE) .......................... 100 47 907

(51) Int. Cl.[7] ................................. H03K 5/19
(52) U.S. Cl. ............................ 327/20; 327/18
(58) Field of Search ............................. 327/18, 20, 77, 327/78, 81, 87

(56) References Cited

U.S. PATENT DOCUMENTS 6,184,783 B1 * 2/2001 Sumida ...................... 340/438

FOREIGN PATENT DOCUMENTS

| DE | 3312153 A 1 | 10/1984 |
| DE | 44 14 734 A | 11/1995 |
| DE | 0911719 A2 * | 6/1998 |
| DE | WO 99/24284 * | 5/1999 |
| DE | 199 17 819 A 1 | 11/2000 |

OTHER PUBLICATIONS

U. Tietze et al.: „Halbleiter–Schaltungstechnik (Semiconductor Circuit Technology), vol. 10, p. 772.

* cited by examiner

Primary Examiner—Timothy P. Callahan
Assistant Examiner—Linh Nguyen
(74) Attorney, Agent, or Firm—Laurence A. Greenberg; Werner H. Stemer; Ralph E. Locher

(57) ABSTRACT

A circuit for detecting a state of at least one electrical actuating element is described. The circuit has a signal input for receiving an input signal representing the state of the actuating element, a signal output for emitting an output signal representing the state of the actuating element, a control output for emitting an activation signal for an evaluation unit, to change over the evaluation unit from an inactive operating state to an active operating state, and a control unit. The control unit is connected to the signal input on the input side and to the control output on the output side and serves for generating the activation signal in a manner dependent on the input signal. The input signal at the signal input is an analog signal, the control unit generating the activation signal for the evaluation unit if the input signal lies within a predetermined range.

11 Claims, 1 Drawing Sheet

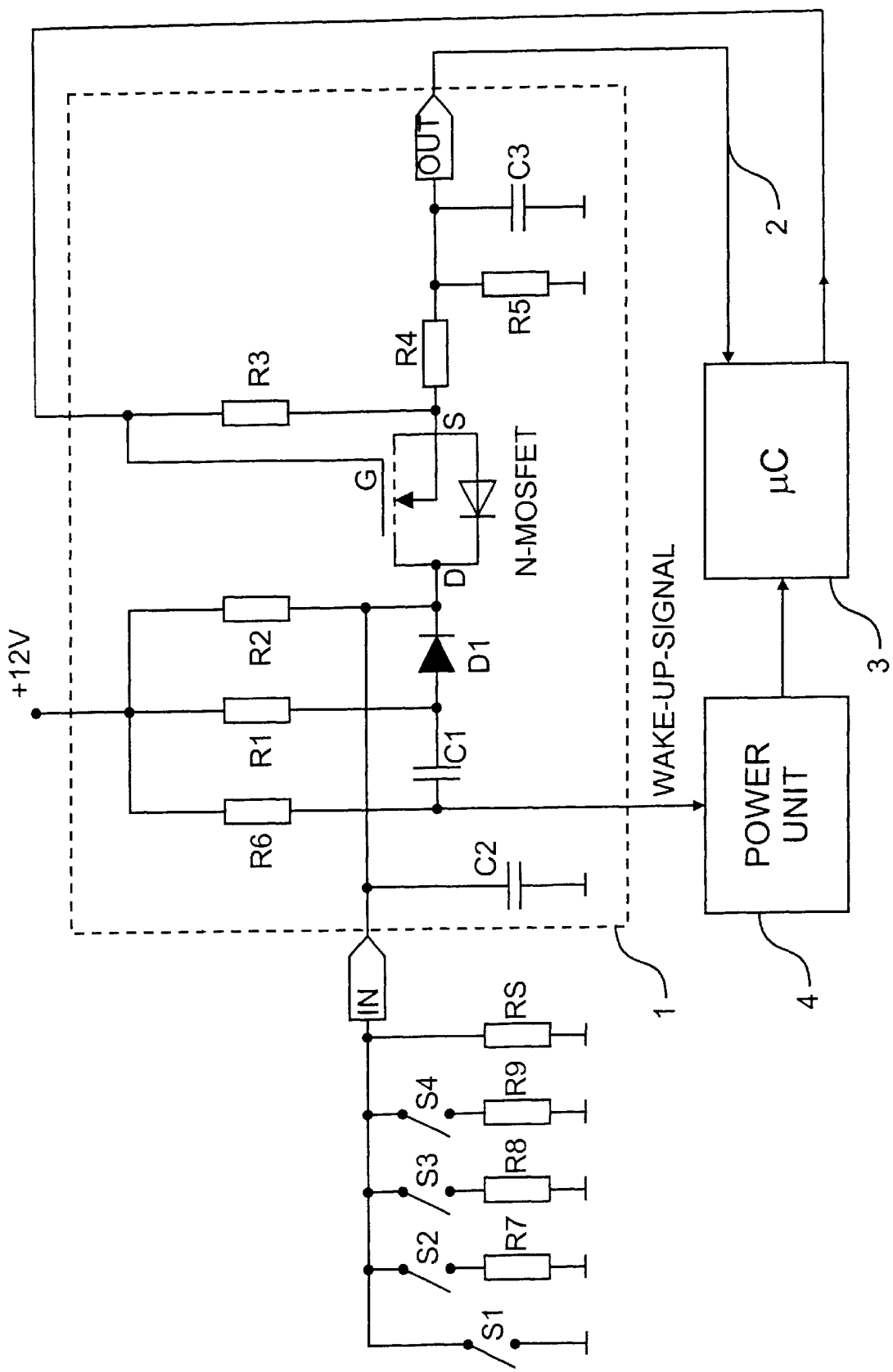

CIRCUIT CONFIGURATION FOR DETECTING THE STATE OF AT LEAST ONE ELECTRICAL ACTUATING ELEMENT

BACKGROUND OF THE INVENTION

FIELD OF THE INVENTION

The invention relates to a circuit configuration for detecting the state of at least one electrical actuating element, in particular for detecting an actuation of switching elements in a motor vehicle. Such circuit configurations generally have a signal input for receiving an input signal representing the state of the actuating element, a signal output for emitting an output signal representing the state of the actuating element, and a control output for emitting an activation signal for an evaluation unit, in order to change over the evaluation unit from an inactive operating state to an active operating state. A control unit is provided, which is connected to the signal input on the input side and to the control output on the output side and serves for generating the activation signal in a manner dependent on the input signal. The input signal present at the signal input is an analog signal, the control unit generates the activation signal for the evaluation unit if the input signal lies within a predetermined range of values.

In modern motor vehicles, electrical loads, such as, for example, the interior lighting, are controlled by a microprocessor in a manner dependent on the switching state of a plurality of switching elements such as, for example, door contact switches, trunk closure switches and ignition lock switches. This has the disadvantage that the microprocessor consumes current in the course of checking the switching state of the individual switching elements, which leads to considerable loading on the vehicle battery in particular when the motor vehicle is not used for a relatively long time.

In order to solve this problem, German Patent DE 44 14 734 C2 discloses a circuit configuration which monitors the switching elements and switches the microprocessor into an active operating state only in the event of an actuation of one of the switching elements, whereas the microprocessor is otherwise operated in a so-called standby mode with a low current consumption. This significantly reduces the current consumption of the microprocessor during the times when the motor vehicle is not used. In this case, the switching state of the individual switching elements is monitored by clocked voltage pulses being applied to the switching elements in each case via series resistors, a voltage measuring unit measuring the voltage that is dropped across the individual switching elements and represents the switching state of the respective switching element. Thus, the electrical potential at the input of the voltage measuring unit is pulled to ground when one of the switching elements is switched on, whereas the electrical potential at the input of the voltage measuring unit corresponds to the supply voltage when the switching elements are open. The known circuit configuration thus enables a current-saving interrogation of digital switching elements with two switching states.

What is disadvantageous about the known circuit configuration it described above is the fact that, at the signal output, an output signal representing the state of the switching elements is generated even when no switching element at all is actuated and, accordingly, there is also no need for an output signal that represents the state of the switching elements. The known circuit configuration is thus always in an active operating state during the clocked voltage pulses, which results in that electrical energy is consumed unnecessarily.

Published, Non-Prosecuted German Patent Application DE33 12 153 A1 discloses a circuit configuration for the interrogation of a plurality of pushbutton switches, which has an evaluation unit, and the evaluation unit can be changed over from an inactive current-saving operating state to an active operating state. For this purpose, the known circuit configuration has a control unit that switches on the operating voltage for the evaluation unit when one of the pushbutton switches is actuated, with the result that the evaluation unit can evaluate the switching states of the individual pushbutton switches. This has the disadvantage that before the evaluation unit is activated, the entire voltage supply must be run up, with the result that the evaluation unit can be activated only with a specific time delay.

Finally, Published, Non-Prosecuted German Patent Application DE 199 17 819 A1 which was published after the priority date of the instant application, discloses a circuit configuration for detecting switching states of switches for the activation of motor vehicle electronics, the circuit configuration generating a wake-up signal if at least one switch undergoes a transition from a first defined switching state to a second defined switching state. The circuit configuration is configured such that it generates the wake-up signal even in the event of a transition from the second switching state to the first switching state.

SUMMARY OF THE INVENTION

It is accordingly an object of the invention to provide a circuit configuration for detecting the state of at least one electrical actuating element which overcomes the above-mentioned disadvantages of the prior art devices of this general type, in which the electrical energy consumption is minimal and the evaluation unit can nevertheless be activated rapidly.

With the foregoing and other objects in view there is provided, in accordance with the invention, a circuit for detecting a state of at least one electrical actuating element. The circuit contains a signal input connected to the actuating element for receiving an input signal representing the state of the actuating element, the input signal being an analog signal. A signal output for emitting an output signal representing the state of the actuating element, is provided, along with an evaluation unit. A control output is provided for emitting an activation signal for switching the evaluation unit from an inactive operating state to an active operating state, and the control output is connected to the evaluation unit. Control circuitry is provided and has an input side connected to the signal input and an output side connected to the control output. The control circuitry generates the activation signal in a manner dependent on the input signal. The control circuitry generates the activation signal for the evaluation unit if the input signal lies within a predetermined range of values. A controllable switching element is connected between the signal input and the signal output and, depending on a switching state of the controllable switching element, the controllable switching element enables an active operating state or an inactive operating state of the circuit. The output signal representing the state of the actuating element is emitted only in an active operating state of the controllable switching element.

The invention contains the general technical teaching of not providing a discriminator with a predetermined threshold value for the interrogation of the actuating elements, but rather of providing a circuit that is insensitive to component fluctuations of the forward and/or reverse resistance of the it actuating elements.

Preferably, a plurality of switching elements each having different reverse and forward resistances are connected in parallel at the signal input of the circuit configuration as according to the invention.

In the preferred embodiment of the invention, the signal input of the circuit configuration according to the invention is connected to the signal output of the circuit configuration via a voltage divider, in order likewise to be able to output an analog signal on the output side.

According to the invention, the controllable switching element is in this case disposed between the signal input and the signal output, and, depending on its switching state, optionally enables an active operating state or an inactive operating state of the circuit configuration. The-output signal represents the state of the actuating element being emitted only in the active operating state of the switching element. Thus, the circuit configuration according to the invention permanently detects, on the input side, the input signal representing the state of the actuating element, in order to be able to change over a separate evaluation unit upon activation of the actuating element to an active operating state. The evaluation unit contains, for example, a microprocessor and an associated power supply, the evaluation unit, upon activation, also activating the circuit configuration according to the invention, in that the control input of the switching element disposed between the signal input and the signal output is correspondingly driven.

The controllable switching element of the circuit configuration according to the invention is preferably a transistor, which may be embodied as an N-channel MOSFET, for example.

In the preferred embodiment of the invention, the contact resistance of the controllable switching element of the circuit configuration in the activated operating state is 1Ω, in order that the output signal is corrupted as little as possible. In this case, currents of up to 20 mA flow via the N-MOSFET, which generates a still acceptable voltage drop of up to 20 mV. A larger contact resistance of the N-MOSFET would cause an additional error in the voltage measurement.

In accordance with an added feature of the invention, a voltage terminal for receiving a voltage source is provided. A resistor is connected between the signal input and the voltage terminal, in order that the signal input, during an inactive operating state of the controllable switching element, is kept essentially at a predetermined voltage level of the voltage source.

In accordance with an additional feature of the invention, the control circuitry has a series circuit containing a resistor, a capacitor and a diode connected to the signal input, and the resistor is connected to the voltage terminal. The series circuit has a voltage tap connected to the control output.

In accordance with a further feature of the invention, a ground terminal is provided and a buffer capacitor is connected between the signal input and the ground terminal. Additionally, a further buffer capacitor is connected between the signal output and the ground terminal.

Other features which are considered as characteristic for the invention are set forth in the appended claims.

Although the invention is illustrated and described herein as embodied in a circuit configuration for detecting the state of at least one electrical actuating element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block diagram of a circuit configuration according to the invention.

DESCRIPTION OF THE PREFERRED EMBODIMENTS

Referring now to the single FIGURE of the drawing, there is shown a preferred exemplary embodiment of a circuit configuration 1 according to the invention. The circuit configuration 1 makes it possible to interrogate a plurality of switching elements S1–S4, which have different internal resistances $R7=100\Omega$, $R8=270\Omega$, $R9=820\Omega$ in the switched-on state. For this purpose, the circuit configuration 1 is provided with a signal input IN, at which the switching elements S1–S4 are connected in parallel. Furthermore, the signal input IN is additionally connected to ground via a resistor $RS=5$ k$\Omega$, the resistor RS taking account of parasitic current paths.

On the input side, the circuit configuration 1 has a buffer capacitor $C2=10$ nF, which connects the signal input to ground and smoothes switching spikes.

Furthermore, the circuit configuration 1 according to the invention has a signal output OUT, which is connected to a microprocessor 3 via a signal line 2 in order to feed the analog input signal present at the signal input IN of the circuit configuration 1 to the microprocessor 3 for evaluation.

In this case, the microprocessor 3 can be operated in a current-saving inactive operating state and in an active operating state which is prescribed by a power supply unit 4, the power supply unit 4 in turn being driven by the circuit configuration 1 by an activation signal (wake-up signal). The circuit configuration 1 thus detects the switching state of the switching elements S1–S4 and, in the event of an actuation of one of the switching elements S1–S4, passes an activation signal to the power supply unit 4, which thereupon changes over the microprocessor 3 to the active operating state, which enables interrogation and evaluation of the analog output signal appearing at the signal output OUT of the circuit configuration 1.

However, the circuit configuration 1 outputs the analog output signal only in an active operating state, whereas exclusively a change interrogation of the switching elements S1–S4 is effected in an inactive operating state of the circuit configuration 1. Therefore, after its activation, the microprocessor 3 likewise changes over the circuit configuration 1 to the active operating state, in order that the analog output signal appears at the signal output OUT of the circuit configuration. The construction of the circuit configuration 1 will now be described below in order subsequently to explain the method of operation of the circuit configuration 1 with reference to the description of the structural construction of the circuit configuration.

The signal input IN is connected to the signal output via an N-channel MOSFET and a voltage divider containing two nonreactive resistors $R4=75$ k$\Omega$ and $R5=33$ k$\Omega$, the N-channel MOSFET turning on in the active operating state of the circuit configuration 1, whereas the N-channel MOSFET turns off in the inactive operating state of the circuit configuration 1.

The signal output OUT of the circuit configuration 1 is connected to ground via a buffer capacitor C3=1 nF, in order to smooth the output signal.

The drain terminal of the N-channel MOSFET is connected to a supply voltage of +12 V via a series circuit containing a diode D1 of the BAV70 type, a capacitor C1=100 nF and a resistor R6=10 kΩ. Furthermore, a voltage tap is provided between the resistor R6 and the capacitor C1, which voltage tap forms a control output for emitting the activation signal for the microprocessor.

Furthermore, the drain terminal of the N-channel MOSFET is connected to the supply voltage of +12 V via a resistor R2=80 kΩ. The resistor R2 holds the voltage at the signal input IN continuously at the voltage level of the supply voltage of +12 V as long as the switching elements S1–S4 are open.

Furthermore, another voltage tap is provided between the diode D1 and the capacitor C1, which voltage tap is connected to the supply voltage of +12 V via a resistor R1=100 kΩ. The resistor R1 enables the capacitor C1 to be discharged after a wake-up event.

The N-channel MOSFET is driven by the microprocessor 3, which, for this purpose, is indirectly connected to the gate terminal G of the N-channel MOSFET. Furthermore, the gate terminal G is additionally connected to the source terminal of the N-channel MOSFET via a resistor R3=620Ω.

The method of operation of the circuit configuration 1 will now be described below with reference to the above description of the circuitry construction of the circuit configuration 1.

In the inactive state of the circuit configuration 1, the analog input signal present at the signal input IN is not passed through to the signal output OUT, but rather merely interrogated, in order to identify the actuation of one of the switching elements S1–S4 and thereupon to be able to change over the microprocessor 3 to the active operating state. In the inactive operating state of the circuit configuration 1, the resistor R2 ensures that essentially the supply voltage of +12 V is present at the signal input IN of the circuit configuration 1 as long as the switching elements S1–S4 are open. When one of the switching elements S1–S4 is closed, by contrast, a current flows from the supply voltage +12 V via the resistor R6, the capacitor C1, the diode D1, the signal input IN and the switched-on switching element S1, S2, S3 or S4 to ground. This current leads to charging of the capacitor C1, which is manifested as a voltage pulse at the control output of the circuit configuration and leads to activation of the power supply unit 4 and of the microprocessor 3. The microprocessor thereupon passes, every 10 ms, a voltage pulse having a duration of 500 μs and an amplitude of +12 V to the gate terminal of the N-channel MOSFET, which thereupon turns on, with the result that the signal input IN of the circuit configuration 1 is connected to the voltage divider R4, R5 in a low-impedance manner. An analog output signal representing the state of the switching element S1, S2, S3 or S4 then appears at the signal output OUT of the circuit configuration 1, which output signal can be evaluated by the microprocessor 3.

In the switched-on state, the contact resistance of the N-channel MOSFET between the source terminal and the drain terminal is 1Ω, in order that the analog output signal is corrupted as little as possible. In this case, currents of up to 20 mA flow via the resistor R3 and the MOSFET, which lead to a voltage drop across the MOSFET of up to 20 mV. A larger forward resistance of the MOSFET would cause additional errors in the voltage measurement.

The invention is not restricted to the preferred exemplary embodiment described above. Rather, there are a multiplicity of conceivable variants and modifications that make use of the concept of the invention and therefore likewise come within the scope of protection.

I claim:

1. A circuit for detecting a state of at least one electrical actuating element, the circuit comprising:
   a signal input connected to the actuating element for receiving an input signal representing the state of the actuating element, the input signal being an analog signal;
   a signal output for emitting an output signal representing the state of the actuating element;
   an evaluation unit;
   a control output for emitting an activation signal for switching said evaluation unit from an inactive operating state to an active operating state, said control output connected to said evaluation unit;
   control circuitry having an input side connected to said signal input and an output side connected to said control output, said control circuitry generating the activation signal in a manner dependent on the input signal, said control circuitry generating the activation signal for said evaluation unit if the input signal lies within a predetermined range of values; and
   a controllable switching element connected between said signal input and said signal output and, depending on a switching state of said controllable switching element, said controllable switching element one of enabling an active operating state and an inactive operating state of the circuit, the output signal representing the state of the actuating element being emitted only in an active operating state of said controllable switching element.

2. The circuit according to claim 1, wherein the actuating element is one of a plurality of actuating elements connected to said signal input, each of the actuating elements having different contact resistances in a switched-on state.

3. The circuit according to claim 1, including a voltage divider having a first input connected to said controllable switching element and a center tap connected to said signal output.

4. The circuit according to claim 1, wherein said controllable switching element has a control input connected to said evaluation unit in order, in an event of an activation of said evaluation unit, said evaluation unit turning on said controllable switching element and putting the circuit in the active operating state.

5. The circuit according to claim 1, wherein said controllable switching element is a transistor.

6. The circuit according to claim 5, wherein sad controllable switching element is a MOSFET transistor.

7. The circuit according to claim 1, wherein said controllable switching element has a resistance in the activated operating state of less than 1 ohm, in order that the output signal is corrupted as little as possible.

8. The circuit according to claim 1, including:
   a voltage terminal for receiving a voltage source; and
   a resistor connected between said signal input and said voltage terminal, in order that the signal input, during an inactive operating state of said controllable switching element, is kept essentially at a predetermined voltage level of the voltage source.

9. The circuit according to claim 8, wherein said control circuitry has a series circuit containing a resistor, a capacitor and a diode connected to said signal input, said resistor is connected to said voltage terminal, said series circuit having a voltage tap connected to said control output.

10. The circuit according to claim 1, including:
   a ground terminal; and
   a buffer capacitor connected between said signal input and said ground terminal.

11. The circuit according to claim 1, including:
   a ground terminal; and
   a buffer capacitor connected between said signal output and said ground terminal.

* * * * *